(12) United States Patent
Creigh

(10) Patent No.: US 7,460,840 B2
(45) Date of Patent: Dec. 2, 2008

(54) METHOD OF TEST CHARACTERIZATION OF AN ANALOG FRONT END RECEIVER IN A COMMUNICATION SYSTEM

(75) Inventor: John Lock Creigh, Rancho Santa Margari, CA (US)

(73) Assignee: Broadcom Corporation, Irvine, CA (US)

( * ) Notice: Subject to any disclaimer, the term of this patent is extended or adjusted under 35 U.S.C. 154(b) by 692 days.

(21) Appl. No.: 11/022,854

(22) Filed: Dec. 28, 2004

(65) Prior Publication Data

US 2006/0141937 A1  Jun. 29, 2006

(51) Int. Cl.
*H04B 17/00* (2006.01)

(52) U.S. Cl. .............. 455/115.1; 455/115.2; 455/67.11; 455/67.14; 375/219; 375/224; 370/241; 370/249

(58) Field of Classification Search .............. 455/232.1, 455/226.1, 239.1–250.1, 424, 425, 456.5, 455/456.6, 561, 67.11, 67.14, 115.1, 115.2, 455/127.1, 135, 138, 234.2, 245.1, 312, 550.1, 455/575.1, 226.2, 226.3; 375/259, 345, 225, 375/227, 219, 224; 370/241, 342, 249, 280, 370/459, 528, 464, 468, 522; 714/704, 715, 714/712, 733

See application file for complete search history.

(56) References Cited

U.S. PATENT DOCUMENTS

| | | | | |
|---|---|---|---|---|
| 3,555,182 | A * | 1/1971 | Griepentrog | 348/535 |
| 4,031,469 | A * | 6/1977 | Johnson | 455/226.4 |
| 5,337,316 | A * | 8/1994 | Weiss et al. | 714/716 |
| 5,625,307 | A * | 4/1997 | Scheinberg | 327/113 |
| 5,742,589 | A * | 4/1998 | Murata | 370/249 |
| 5,901,347 | A * | 5/1999 | Chambers et al. | 455/234.1 |
| 6,009,317 | A * | 12/1999 | Wynn | 455/296 |
| 6,625,433 | B1 * | 9/2003 | Poirier et al. | 455/232.1 |
| 6,816,987 | B1 * | 11/2004 | Olson et al. | 714/704 |
| 6,834,078 | B1 * | 12/2004 | Niemela et al. | 375/224 |
| 7,062,243 | B2 * | 6/2006 | Simmons et al. | 455/234.1 |
| 7,248,625 | B2 * | 7/2007 | Chien | 375/219 |
| 2002/0060751 | A1 * | 5/2002 | Rowe et al. | 348/678 |
| 2002/0111144 | A1 * | 8/2002 | Schiff | 455/69 |
| 2003/0186665 | A1 * | 10/2003 | Black et al. | 455/240.1 |
| 2003/0199258 | A1 * | 10/2003 | Matsuki et al. | 455/136 |
| 2004/0120407 | A1 * | 6/2004 | Searles et al. | 375/259 |
| 2004/0198340 | A1 * | 10/2004 | Lee et al. | 455/423 |
| 2004/0259510 | A1 * | 12/2004 | Audinot et al. | 455/136 |
| 2005/0032487 | A1 * | 2/2005 | Montalvo | 455/126 |
| 2005/0059367 | A1 * | 3/2005 | Kim | 455/138 |

(Continued)

FOREIGN PATENT DOCUMENTS

GB  2390495  *  1/2004

*Primary Examiner*—Edward Urban
*Assistant Examiner*—Charles Chow
(74) *Attorney, Agent, or Firm*—Sterne, Kessler, Goldstein & Fox PLLC

(57) ABSTRACT

A multi-port transceiver includes a transmitter and receiver for each port. The invention is a test method and apparatus for testing individual components in the transmit and receive paths. Specifically, the invention includes a method of testing the full range of a programmable gain amplifier (PGA) and an analog to digital converter (ADC) in the receive path of each port. This is accomplished by connecting the transmitter of one port directly to the receiver of a second port, and varying the amplitude of the transmitter over a range of gain settings of the PGA while examining if the dynamic range of the receiver has been exceeded.

28 Claims, 3 Drawing Sheets

U.S. PATENT DOCUMENTS

2005/0090245 A1* 4/2005 Kim .......................... 455/425
2005/0221763 A1* 10/2005 Song ....................... 455/67.11
2006/0052070 A1* 3/2006 Jin et al. ................. 455/127.2
2006/0093026 A1* 5/2006 Montojo et al. ............. 375/225
2007/0213022 A1* 9/2007 Darabi .................... 455/232.1

* cited by examiner

METHOD OF TEST CHARACTERIZATION OF AN ANALOG FRONT END RECEIVER IN A COMMUNICATION SYSTEM

BACKGROUND OF THE INVENTION

1. Field of the Invention

The present invention relates to a transceiver and more specifically to a method and apparatus of testing a receiver of an analog front end of a communication system transceiver.

2. Background Art

A communication device including a transmitter and a receiver is known as a transceiver. In many transceivers, the receiver consists of an analog front end (AFE) followed by digital processing. Examples of such transceivers are 1000BaseT Gigabit Ethernet transceivers and 100BaseTX Fast Ethernet transceivers. The AFE generally includes an analog to digital converter (ADC) and a programmable gain amplifier (PGA) and typically performs functions which include analog to digital conversion, filtering, gain control, hybrid summation, and common mode rejection.

Under normal operating conditions, a transceiver is susceptible to various distortions of the received signal caused by both internal and external sources. Therefore, it is useful to test the characteristics of the transceiver in its ability to perform properly under these conditions. Conventional methods of testing transceivers, however, during production and under operation, do not accurately determine the performance or stress the receive path of the transceiver.

The received signal of the transceiver may be susceptible to noise and distortion produced by the internal components of the transceiver and by the channel. For example, in a system that transmits bidirectionally over a channel, the transmitter of the transceiver may introduce a large echo into the received signal. In such a situation, a hybrid is typically performed to subtract a replica of the transmitted signal from the received signal. Furthermore, the ADC in the AFE may produce distortions in the digitized received signal due to the internal non-idealities and the jitter of the clock used to sample the received signal. The received signal may be further distorted by digital processing performed outside the AFE to equalize and detect the received signal. Finite word length effects and adaptation noise in the digital processing may further add noise to the received signal.

In addition to the distortions caused by the internal components of the transceiver, distortions may be produced by external sources. For example, the received signal may be significantly attenuated by traveling through a long channel or crosstalk from a different transmitter may be introduced into the received signal.

Conventional methods of testing the receiver of the transceiver during production involves generating various sine waves of different frequency and amplitude and applying it to the receiver of the transceiver at different settings of the PGA. A high quality (low distortion) signal source is used to generate the sine waves and pins are allocated to the ADC chip to allow an external device to monitor the digital code words generated by the ADC. The data obtained from this process is post processed to obtain receive path performance metrics for each PGA gain setting such as ENOB (effective number of bits). These metrics are compared against thresholds to pass or fail the AFE.

The thresholds are derived by generating models of noise and distortion in the receive path and by applying the models to system simulations to determine whether acceptable bit error rate performance of the transceiver result. Standard metrics of ADC performance such as ENOB, SNR, THD, INL, and DNL are used to control the modeled levels of noise and distortion.

Actual experience testing gigabit Ethernet transceivers using the conventional methods of testing has shown that in some cases, there is only a weak correlation between the derived thresholds and the actual bit error rate and SNR performance of the receiver. The discrepancy can be due to several factors. First, it can be difficult to generate models that accurately reflect the performance of the receive path. Another factor is that the sine wave testing is not performed under normal operating conditions for the transceiver and much of the processing and functions of the components of the transceiver and components interfacing the transceiver are inactive during the test. Hence, the noise that would be normally caused by these functions are not present during the test. Additionally, sine waves are not representative of the complex waveforms received during the normal operation of a transceiver and therefore may not stress the transceiver in the ways a complex receive waveform may.

Conventional production testing of gigabit Ethernet components tests the transceiver in an operational mode by first connecting the transceiver's transmitters back to its own receivers and then sending one or more data packets through the transceiver and monitoring if the data packets have been received without error. Though the chip is used in an operational mode, the receive path is not stressed by the conventional test since the transmitter applies only a full amplitude signal to the receiver and the receiver is operating at its maximum SNR. The conventional test does not take into account that in a real environment, the signal received by the remote transmitter may be significantly attenuated by traveling through a long channel. Furthermore, the conventional test exercises the receive path for only a small subset of the available range of the PGA.

What is needed is a method or apparatus of testing the receiver of the transceiver under an operational mode where the receiver of the transceiver is loaded close to its full dynamic range over a range of PGA gain settings.

BRIEF SUMMARY OF THE INVENTION

The present invention is a method and apparatus for testing a receiver of an analog front end (AFE) of a transceiver. For example, a transceiver may include an analog front end having multiple ports with each port having a transmitter with variable amplitude and a receiver with a programmable gain amplifier (PGA) and an analog to digital converter (ADC).

In applying the invention method of test, a transmitter of a first port is coupled to a receiver of a second port using an external loopback connection. The amplitude of the transmitter of the first port is set to maximum amplitude and the gain of the PGA of the receiver of the second port is set to minimum gain. The amplitude of the transmitter is decreased until the signal transmitted by the transmitter of the first port has been received by the receiver of the second port without error or overflow of the receive dynamic range. This process is repeated for each incremental increase in the gain setting of the PGA of the receiver of the second port.

In determining if the signal transmitted by the transmitter of the first port has been received by the receiver of the second port without error, the invention method of test examines various elements of the transceiver. For example, the ADC of the second port is monitored to determine if the dynamic range of the receiver of the second port has been exceeded. For example, the ADC can be monitored for overflow/underflow conditions. Additionally, the invention method of test detects if the receiver of the second port correctly converged to the signal received from the transmitter of the first port.

Once the signal transmitted by the transmitter of the first port has been received by the receiver of the second port without error, metrics may be optionally acquired. During the acquisition of metrics, the PGA of the receiver of the second port is toggled between its current and previous gain settings and metrics related to the performance of the receiver of the second port such as signal to noise ratio (SNR), bit error, and PGA monotonicity may be acquired. The acquired metrics are then compared to desired limits and the invention method of test may be interrupted if the metrics are outside the desired limits.

Additionally, the amplitude of the transmitter of the first port and the gain setting of the PGA of the receiver of the second port is checked continuously to detect if they are consistent. If they are inconsistent, the invention method of test may be interrupted.

The testing disclosed in this invention may be performed at different times during the manufacture and use of the transceiver. During chip manufacture, tests may be performed on the AFE at pre and post packaging of dies on substrates. When a product using a transceiver is built, the test may be applied to the transceiver as a part of the product. In the field, the test may be applied to a transceiver of a product as a part of the power up procedure or as a diagnostic procedure when problems occur.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Figure 1:
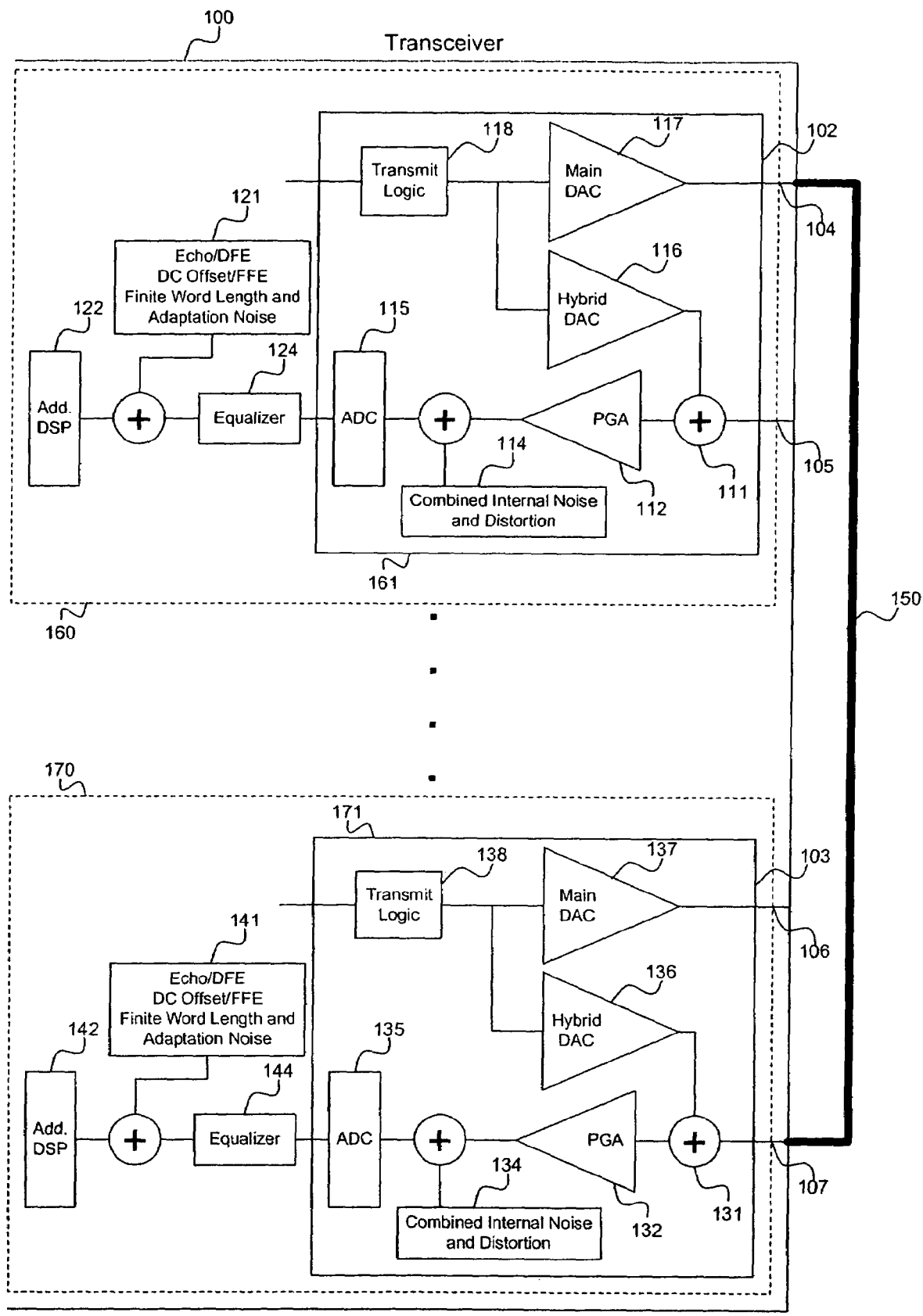
FIG. 1 illustrates a transceiver configured for testing.

FIG. 1 illustrates a structure of a transceiver 100 configured for testing. A person skilled in the art will recognize that this is only one possible arrangement of the elements in a transceiver and that other selections of elements and orders of processing are possible. The transceiver 100 contains a plurality of ports 160 and 170. Port 160 contains an AFE 161 containing a transmitter output 104 and a receiver input 105. Likewise, Port 170 contains an AFE 171 containing a transmitter output 106 and a receiver input 107.

A transmitter of the AFE 161 includes a transmit logic 118, a digital to analog converter 117, and a hybrid digital to analog converter 116. The transmitter is designed to allow the output amplitude to be modulated by a control input to allow a plurality of different output amplitudes. A hybrid summation point 111 subtracts out a replica of the transmitted signal generated by the transmitter from the received signal. A hybrid is needed in systems that transmit bidirectionally over a channel to avoid a large echo that may result from a direct connection of the transmit and receive path circuitry.

A transmitter of the AFE 171 includes a transmit logic 138, a digital to analog converter 137, a hybrid digital to analog converter 136, and a hybrid summation point 131, and operates in a manner similar to the transmitter in AFE 161.

A receiver of the AFE 161 includes a programmable gain amplifier 112 and an analog to digital converter (ADC) 115. Noise and distortion 114 produced by internal sources may affect the received signal. The ADC 115 converts the analog signal received at its input and outputs digital code words at specific points in time. The ADC 115 may cause further distortions in the digitized received signal due to internal non-idealities and jitter of the clock used to sample the data.

A receiver of the AFE 171 includes a programmable gain amplifier 132 and an analog to digital converter (ADC) 135, and operates in a manner similar to the receiver in AFE 161. Noise and distortion 134 produced by internal sources may affect the received signal of AFE 171.

Outside the AFEs, equalizers 124 and 144 provide receiver equalization in their respective ports. Noise 121 and 141 may be added to the received signal due to finite word length effects and adaptation noise. Digital signal processing elements 122 and 142 provide further digital processing and signal detection.

To configure the transceiver for the invention method of test, the transmitter output 104 of a first port 160 is connected to the receiver input 107 of a second port 170 by an external loopback connection 150. The transmitter of the first port 160 of the transceiver is used to generate a signal for the receiver of the second port 170 of the transceiver. All of the ports of the transceiver may be configured such that the output of each transmitter is connected to the receiver of another port. When multiple transmitters are connected in this fashion, crosstalk from one or more transmitters may be introduced into the received signal of a receiver.

The loopback configuration of the transceiver 100 in FIG. 1 allows for the testing of the receiver of the transceiver under an operational mode where the received signal may be affected by noise and distortions produced by internal and external sources that are common under normal operating conditions.

Figure 2:
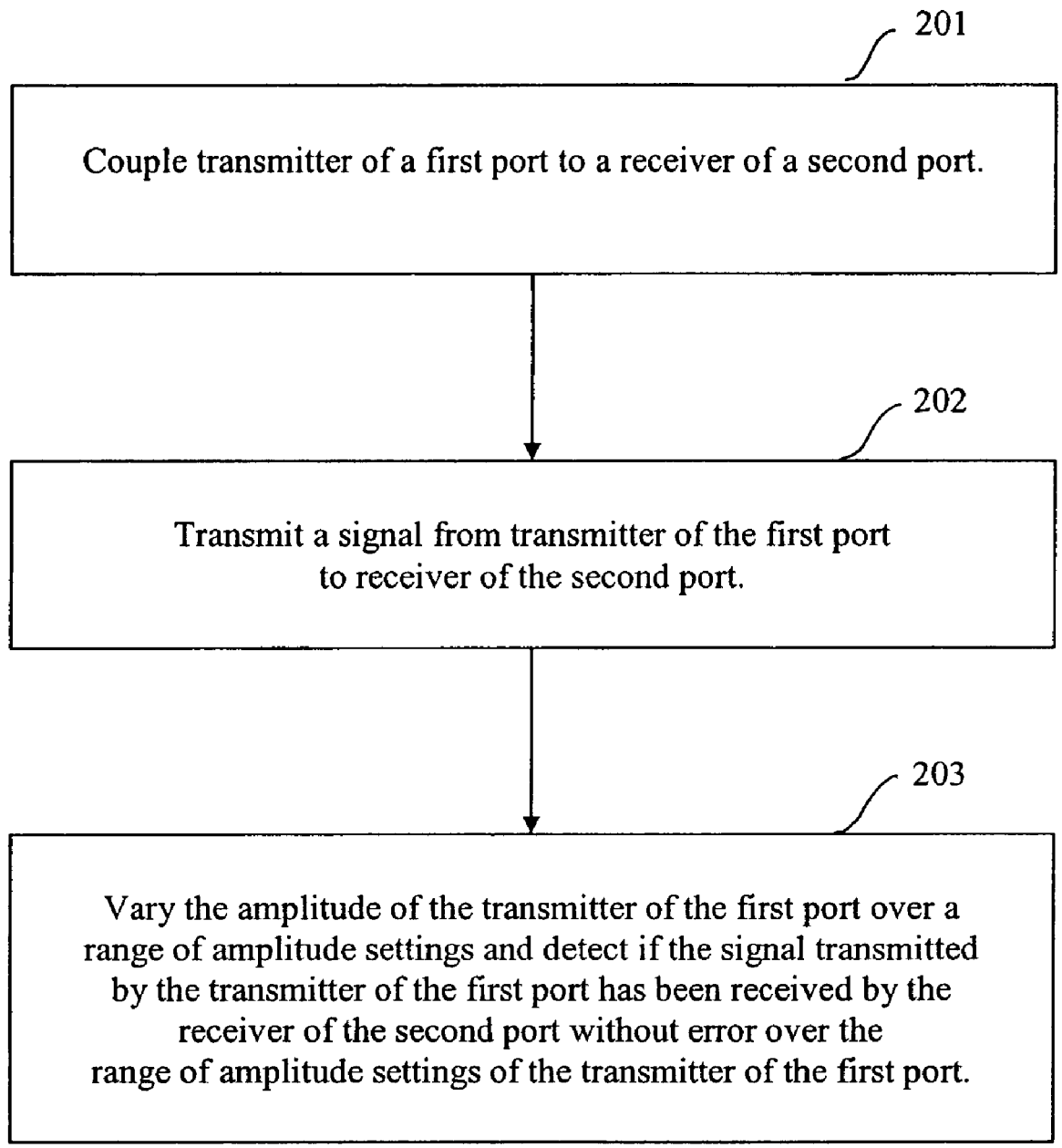
FIG. 2 illustrates a high level description of the method of testing a transceiver according to an embodiment of the present invention.

FIG. 2 illustrates a high level description of the method of testing a transceiver according to the present invention. More specifically, the dynamic range of the receiver is tested over a range of transmitter amplitude values, instead of at a single amplitude value. In step 201, a transmitter of the first port is coupled to a receiver of the second port with an external loopback connection as depicted in FIG. 1. In step 202, a signal from the transmitter of the first port is transmitted to the receiver of the second port. In step 203, the amplitude of the transmitter of the first port is varied and the received signal is examined to detect if the signal at the second port was received without error. For example, the ADC of the receiver is examined for an overflow/underflow condition to determine if the dynamic range of the receiver has been exceeded.

Figure 3:
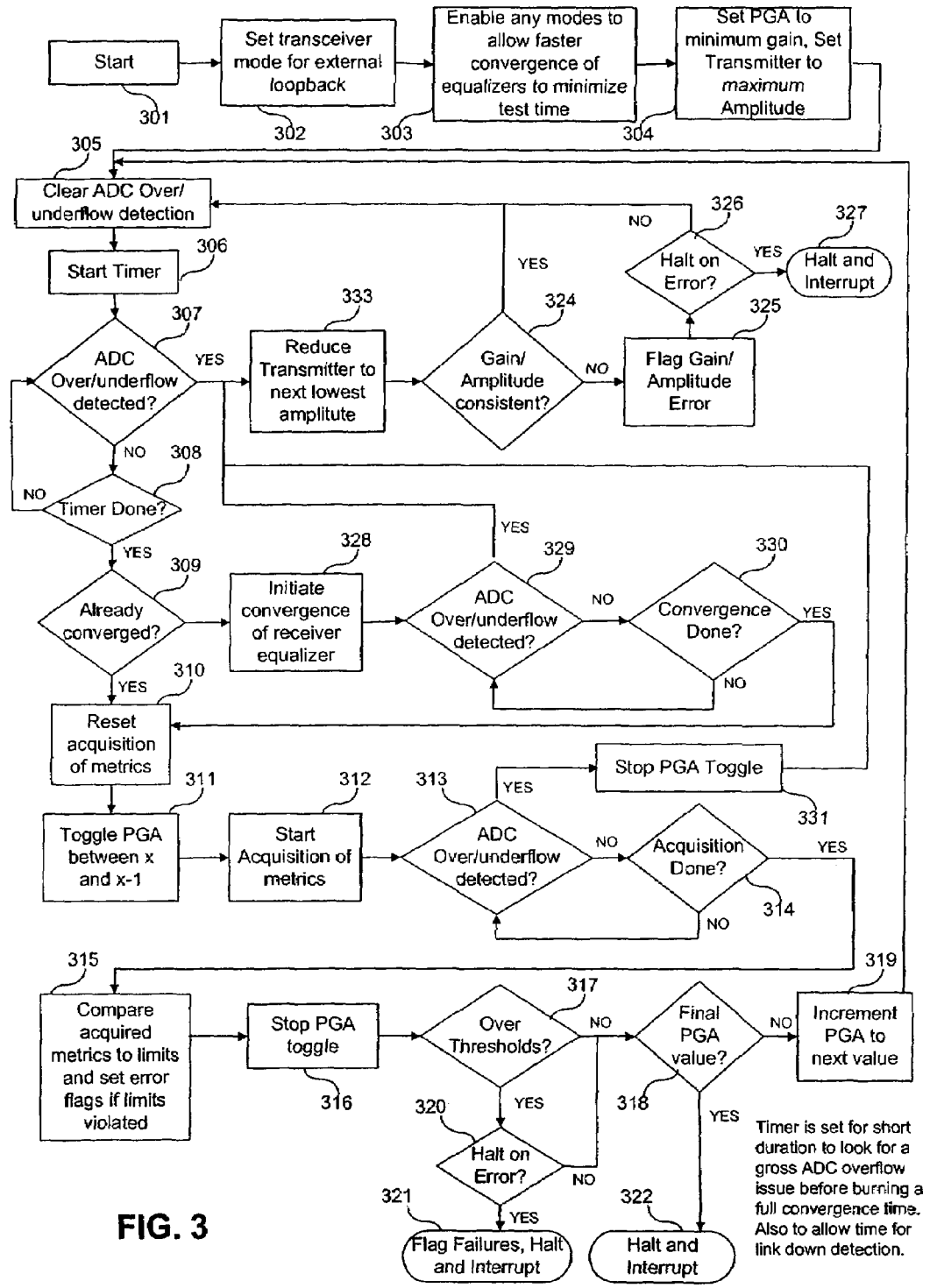
FIG. 3 illustrates a detailed description of the method of testing a transceiver according to an embodiment of the present invention.

FIG. 3 further defines the test method described in FIG. 2. The approach of the invention test is to modify the amplitude of the transmitter to ascertain the maximum amplitude setting which will not exceed the dynamic range of the receiver. The dynamic range of the receiver is determined by the input range of the ADC and other analog and digital dynamic ranges of the receive path. For each gain setting of the PGA of the receiver, the maximum amplitude setting of the transmitter which does not exceed the dynamic range of the receiver is determined and the desired metrics of the transceiver are measured. By doing so, the dynamic range of the receiver is tested over a range of transmitter amplitude values, instead of at a single amplitude value. During this process, the gain setting of the PGA of the receiver is compared with the amplitude setting of the transmitter to ensure that these settings are consistent with expected values.

The invention method is started in step 301 and in step 302, the transceiver is configured with an external loopback connection between a transmitter of a first port and a receiver a second port as depicted in FIG. 1. In other words, the transceiver is configured so that one or more signals are transmitted from the first port to the second port so that the receiver of the second port can be tested under operating conditions. In step 303, the settings of the transceiver may be configured to allow for the reduction of test times. In step 304, the transmitter of the first port is configured to maximum amplitude and the PGA of the receiver of the second port is configured to minimum gain.

In step 305, the overflow/underflow flags are cleared in the ADC of the receiver and a timer in step 306 is started. While the timer has not yet expired in step 308, the receiver is checked to determine if an overflow/underflow condition exists in the ADC of the receiver in step 307. If the condition exists, then the amplitude of the transmitter is reduced in step 333 and a check is made to determine if the resulting amplitude of the transmitter is consistent with the current PGA gain setting of the receiver in step 324. If the amplitude of the transmitter is not consistent with the current PGA gain setting of the receiver, an error is indicated in step 325 and the test may be interrupted in steps 326 and 327. If the reduced amplitude of the transmitter is consistent with the current PGA gain setting of the receiver or if the test is not interrupted in step 326, the test returns to step 305 to determine if the reduced amplitude of the transmitter does not exceed the dynamic range of the receiver for the current gain setting of the PGA of the receiver.

Once an amplitude of the transmitter is found which does not produce an overflow/underflow condition in the ADC of the receiver, a check is performed in step 309 to determine if the receiver correctly converged to the signal received from the transmitter. If the signal has not properly converged, then the receiver is permitted to converge through steps 328 and 330. While the test waits for the signal to properly converge, the ADC of the receiver is continuously checked in step 329 to determine if an overflow/underflow condition exists. If the condition arises during the convergence process, the amplitude of the transmitter is reduced again through step 333.

Once a maximum amplitude of the transmitter has been determined for which the ADC of the receiver is not in an overflow/underflow condition and the signal received from the transmitter has correctly converged, acquisition of metrics is started in step 310. The PGA of the receiver may optionally be toggled between its current and previous values at a rapid rate in step 311 to stress and provide coverage for any timing issues in the PGA control logic. The ADC of the receiver is continuously checked in step 313 for an overflow/underflow condition while the metrics are acquired in steps 312 and 314. If an overflow/underflow condition arises during the metrics acquisition process, the metrics acquisition is stopped in step 331 and the amplitude of the transmitter is reduced again through step 333. The metrics which can be acquired during this process, for example, are signal to noise ratio (SNR), peak error, dc offset of the ADC output, detection of bit errors during data packet transmission, symbol errors during idle transmission between packets, and others. The SNR, peak error and detection of bit errors metrics used here are the same metrics used during normal operation of the receiver and thus directly relate to the performance of the transceiver in normal operation. Once the metrics acquisition has been completed in step 316, the metrics are compared to threshold values in step 315 and if those values are over a threshold in step 317, the test may be interrupted in step 320 and 321.

The gain of the PGA of the receiver is checked in step 318 and if it is not at the final value, then the gain of the PGA is incremented in step 319 and the test continues to step 305. Otherwise, if the gain of the PGA of the receiver is at the final value, then the test has been completed as indicated by step 322.

The invention method of test provides several advantages over pervious methods. Since the transceiver is tested using metrics used to evaluate the communication channels (SNR, errors) rather than analog parameters which are more weakly correlated to the performance of the transceiver, the test can more accurately predict the field performance of the device and therefore lower the number of field returns. In addition, chip yields may potentially be increased by avoiding excessive guard banding that is required by using more weakly correlated metrics.

The invention method of test also requires less expensive production test equipment than the conventional method. Conventional testing requires analog signal generators of high enough linearity to measure the ADC performance. The invention method of test uses the transmitter and normal loopback functions of the physical layer of the transceiver to measure the AFE performance. Since less expensive testers are required to perform the invention method of test, the capital costs for testers can be cut in half in the specific instance of gigabit Ethernet chips.

The invention method of test also requires less time to test the transceiver than the conventional method. The conventional method takes approximately 50 ms per channel to test the PGA and ADC of the AFE. Additionally, the conventional method tests one channel and one port at a time, whereas the invention method of test can test all channels and ports simultaneously. For an eight port transceiver, the conventional method tests 32 channels serially (4 channels per port*8 ports) at 50 ms per channel for a total time of 1.6 seconds. The test per the invention would take 30 ms which reduces the time required to test the PGA and ADC of the AFE by a factor of 50x. Conventional method employs testers which cost approximately 4.5 cents per second while the invention method could employ testers which would cost approximately 2.5 cents per second. Therefore the conventional method would cost 11.5 cents (1.6*4.5) to test the AFE whereas the invention method could cost only 0.075 cents (30 ms*2.5 cents/s).

The invention method of test can be used as a board level test with lowered transmitter levels to detect the presence of on-board noise and distortion that may be caused by power supply, clock jitter, coupling, and other sources. Since the conventional board level production testing uses a 0 meter external loopback connection, the conventional method will detect only the most extreme noise problems and may not detect performance problems that may result in real customer environments.

The invention method of test exercises the PGA control input between adjacent control words as would be seen in a normal system operation. The conventional method only tests the AFE with a static value for the PGA. Hence, if there are defects in the transceiver such that timing problems interfere with correctly timing the switching of the PGA, the conventional test will not detect this problem. However, the invention method of test can detect this problem since it exercises all allowed control word transitions.

The invention method of test can also detect excessive transmitter/hybrid distortion whereas conventional chip production test do not address this problem.

The invention method of test, unlike conventional methods, does not require access to internal test nodes via an external testbus. Therefore, less number of test pads/pins may be used to accommodate smaller dies and chip substrates resulting in a reduction in cost. Hence, the invention method of test may reduce the overall cost of the chip.

The invention method of test is able to test the transceiver under conditions that are much closer to the real operating conditions of the transceiver than conventional methods. For example, the digital signal processing and physical coding sub layer of the transceivers are fully active under the invention method whereas they are not employed in the conventional test methods. Therefore, the invention method of test can determine the impact of certain issues that are not possible by the conventional methods. For example, the invention method of test can determine the subsequent degradation of the received signal when the switching noise from the digital signal processing and physical coding sub layer is coupled into the AFE.

CONCLUSION

Example embodiments of the methods, systems, and components of the present invention have been described herein. As noted elsewhere, these example embodiments have been described for illustrative purposes only, and are not limiting. Other embodiments are possible and are covered by the invention. Such other embodiments will be apparent to persons skilled in the relevant art(s) based on the teachings contained herein. Thus, the breadth and scope of the present invention should not be limited by any of the above-described exemplary embodiments, but should be defined only in accordance with the following claims and their equivalents.

What is claimed is:

1. In a transceiver having a plurality of ports with each port including a transmitter with a variable amplitude and a receiver having a programmable gain amplifier (PGA) and an analog to digital converter (ADC), a method for testing the components of the transceiver, comprising:
    (1) coupling a transmitter of a first port to a receiver of a second port, wherein an amplitude of the transmitter of the first port is set to a maximum amplitude and a gain of the PGA of the receiver of the second port is set to a minimum gain;
    (2) transmitting a signal from the transmitter of the first port to the receiver of the second port; and
    (3) varying the amplitude of the transmitter of the first port over a range of amplitude settings and detecting if the signal transmitted by the transmitter of the first port has been received by the receiver of the second port without error over the range of amplitude settings of the transmitter of the first port.

2. The method of claim 1, wherein step (3) includes the step of detecting if a dynamic range of the receiver of the second port has been exceeded.

3. The method of claim 2, wherein step (3) further includes examining the ADC of the receiver of the second port to detect if the ADC is in an overflow/underflow condition.

4. The method of claim 1, wherein step (3) includes the step of detecting if the receiver of the second port correctly converged to the signal received from the transmitter of the first port.

5. The method of claim 1, wherein step (3) includes the step of detecting if the amplitude of the transmitter of the first port is consistent with the gain of the PGA of the receiver of the second port.

6. The method of claim 1, wherein step (3) is followed by:
    (4) repeating step (3) for a range of gain settings of the PGA of the receiver of the second port.

7. The method of claim 6, wherein step (3) includes acquiring metrics of the receiver of the second port, comprising:
    (a) acquiring metrics related to a performance of the receiver of the second port; and
    (b) comparing the acquired metrics to threshold limits.

8. The method of claim 7, wherein step (a) is preceded with the step of toggling the PGA of the receiver of the second port between its current and previous gain settings.

9. The method of claim 7, wherein step (b) includes acquiring metrics for at least one of a signal to noise ratio (SNR), a bit error, and a PGA monotonicity of the receiver of the second port.

10. In a transceiver having a plurality of ports with each port including a transmitter with a variable amplitude and a receiver having a programmable gain amplifier (PGA) and an analog to digital converter (ADC), a method for testing the components of the transceiver, comprising:
    (1) coupling a transmitter of a first port to a receiver of a second port and setting the gain of the PGA of the receiver of the second port to a minimum gain and setting the amplitude of the transmitter of the first port to a maximum amplitude;
    (2) transmitting a signal from the transmitter of the first port to the receiver of the second port; and
    (3) varying the amplitude of the transmitter of the first port over a range of amplitude settings and detecting if the signal transmitted by the transmitter of the first port has been received by the receiver of the second port without error over the range of amplitude settings of the transmitter of the first port by:
        (a) decreasing the amplitude of the transmitter of the first port if the dynamic range of the receiver of the second port has been exceeded;
        (b) detecting if the receiver of the second port has correctly converged to the signal received from the transmitter of the first port;
        (c) detecting if the amplitude of the transmitter of the first port is consistent with the gain of the PGA of the receiver of the second port;
        (d) increasing the gain of the PGA of the receiver of the second port; and
        (e) repeating steps (a)-(d) while the gain of the PGA of the receiver of the second port is not at a maximum.

11. The method of claim 10, wherein step (e) includes the step of interrupting the repetition of steps (a)-(d) if the amplitude of the transmitter of the first port is inconsistent with the gain of the PGA of the receiver of the second port.

12. A transceiver having a plurality of ports, comprising:
    a first port including a transmitter with a variable amplitude;
    a second port including a receiver having a programmable gain amplifier (PGA) and an analog to digital converter (ADC);
    an output of the transmitter of the first port connected to an input of the receiver of the second port, wherein an amplitude of the transmitter of the first port is set to a maximum amplitude and a gain of the PGA of the receiver of the second port is set to a minimum gain;
    wherein the transmitter of the first port is configured to transmit multiple signals to the receiver of the second port, wherein the multiple signals have a range of amplitude settings, the receiver of the second port is configured to be monitored to detect if the multiple signals transmitted by the transmitter of the first port have been received by the receiver of the second port without error over the range of amplitude settings of the transmitter of the first port.

13. The transceiver of claim 12, wherein the receiver of the second port is configured to be monitored to detect if a dynamic range of the receiver of the second port has been exceeded.

14. The transceiver of claim 13, wherein the ADC of the receiver of the second port is configured to be monitored to detect if an underflow or overflow condition has been created over the range of amplitude settings.

15. The transceiver of claim 12, wherein the receiver of the second port is configured to be monitored to detect if the receiver of the second port correctly converged to the signal received from the transmitter of the first port.

16. The transceiver of claim 12, wherein the PGA of the receiver of the second port and the transmitter of the first port are configured to be monitored to detect if the amplitude of the transmitter of the first port is consistent with the gain of the PGA of the receiver of the second port.

17. The transceiver of claim 12, wherein the receiver of the second port is configured to be monitored while the amplitude of the transmitter of the first port is varied for a range of gain settings of the PGA of the receiver of the second port.

18. The transceiver of claim 17, wherein the receiver of the second port is configured to acquire metrics related to the performance of the receiver of the second port to compare the metrics with threshold limits.

19. The transceiver of claim 18, wherein the PGA of the receiver of the second port is configured to be toggled between its current and previous gain settings prior to acquiring the metrics related to the performance of the receiver of the second port.

20. The transceiver of claim 18, wherein the metrics include at least one of a signal to noise ratio (SNR), a bit error, and a PGA monotonicity of the receiver of the second port.

21. The transceiver of claim 12, wherein
the receiver of the second port is configured to be monitored and the transmitter of the first port is configured to decrease the amplitude of the transmitter of the first port if a dynamic range of the receiver of the second port has been exceeded.

22. The transceiver of claim 12, wherein
the receiver of the second port is configured to be monitored to detect if the receiver of the second port has correctly converged to the signal received from the transmitter of the first port.

23. The transceiver of claim 12, wherein
the transmitter of the first port and the PGA of the receiver of the second port are configured to be monitored to detect if the gain of the PGA of the receiver of the second port is consistent with the amplitude of the transmitter of the first port.

24. The transceiver of claim 12, wherein:
the receiver of the second port is configured to be monitored and the transmitter of the first port is configured to decrease the amplitude of the transmitter of the first port if a dynamic range of the receiver of the second port has been exceeded;
the transmitter of the first port and the PGA of the receiver of the second port are configured to be monitored to detect if the gain of the PGA of the receiver of the second port is consistent with the amplitude of the transmitter of the first port; and
the PGA of the receiver of the second port is configured to increase the gain of the PGA of the receiver of the second port.

25. The transceiver of claim 12, wherein
the transmitter of the first port and the PGA of the receiver of the second port are configured to be monitored and the transmitter of the first port is configured to interrupt varying the amplitude of the transmitter of the first port and the PGA of the receiver of the second port is configured to interrupt varying the gain of the PGA of the receiver of the second port if the amplitude of the transmitter of the first port is inconsistent with the gain of the PGA of the receiver of the second port.

26. In a transceiver having a plurality of ports with each port including a transmitter with a variable amplitude and a receiver having a programmable gain amplifier (PGA) and an analog to digital converter (ADC), a method for testing the components of the transceiver, comprising:
(1) coupling a transmitter of a first port to a receiver of a second port, wherein an amplitude of the transmitter of the first port is set to a maximum amplitude and a gain of the PGA of the receiver of the second port is set to a minimum gain;
(2) transmitting a signal from the transmitter of the first port to the receiver of the second port;
(3) decreasing the amplitude of the transmitter of the first port if a dynamic range of the receiver of the second port has been exceeded;
(4) detecting if the receiver of the second port has correctly converged to the signal received from the transmitter of the first port;
(5) detecting if the amplitude of the transmitter of the first port is consistent with the gain of the PGA of the receiver of the second port; and
(6) increasing the gain of the PGA of the receiver of the second port.

27. The method of claim 26, further comprising repeating, while the gain of the PGA of the receiver of the second port is other than at a maximum, the decreasing, the detecting if the receiver of the second port has correctly converged to the signal received from the transmitter of the first port, the detecting if the amplitude of the transmitter of the first port is consistent with the gain of the PGA of the receiver of the second port, and the increasing.

28. The method of claim 27, wherein the repeating is interrupted if the amplitude of the transmitter of the first port is inconsistent with the gain of the PGA of the receiver of the second port.

* * * * *

UNITED STATES PATENT AND TRADEMARK OFFICE
CERTIFICATE OF CORRECTION

PATENT NO. : 7,460,840 B2
APPLICATION NO. : 11/022854
DATED : December 2, 2008
INVENTOR(S) : John Lock Creigh Page 1 of 1

It is certified that error appears in the above-identified patent and that said Letters Patent is hereby corrected as shown below:

In the Claims, Claim 18, Column 9,
In Line 28 please replace "second port to" with --second port and to--.

Signed and Sealed this

Twenty-fourth Day of March, 2009

JOHN DOLL
*Acting Director of the United States Patent and Trademark Office*